US009190012B2

(12) United States Patent
Carter

(10) Patent No.: US 9,190,012 B2
(45) Date of Patent: Nov. 17, 2015

(54) METHOD AND SYSTEM FOR IMPROVING DISPLAY UNDERFLOW USING VARIABLE HBLANK

(75) Inventor: Collis Quinn Carter, Richmond Hill, CA (US)

(73) Assignee: ATI Technologies ULC, Markham (ON) (CA)

( * ) Notice: Subject to any disclaimer, the term of this patent is extended or adjusted under 35 U.S.C. 154(b) by 827 days.

(21) Appl. No.: 12/646,629

(22) Filed: Dec. 23, 2009

(65) Prior Publication Data

US 2011/0148889 A1 Jun. 23, 2011

(51) Int. Cl.
*G06T 1/20* (2006.01)
*G09G 5/00* (2006.01)

(52) U.S. Cl.
CPC ............ *G09G 5/006* (2013.01); *G09G 2350/00* (2013.01); *G09G 2370/04* (2013.01)

(58) Field of Classification Search
CPC . G06T 1/20; G09G 2350/00; G09G 2330/021
See application file for complete search history.

(56) References Cited

U.S. PATENT DOCUMENTS 5,841,471 A * 11/1998 Endsley et al. ............ 348/231.6
5,894,332 A * 4/1999 Yamagishi ..................... 348/564
5,929,924 A * 7/1999 Chen ............................. 348/552
6,014,749 A * 1/2000 Gloor et al. .................... 713/300
6,020,901 A * 2/2000 Lavelle et al. ................ 345/545
6,144,996 A * 11/2000 Starnes et al. ................ 709/217
6,160,847 A * 12/2000 Wu et al. ..................... 375/240.1
6,249,847 B1 * 6/2001 Chin et al. .................... 711/151
6,329,996 B1 * 12/2001 Bowen et al. ................. 345/506
6,546,156 B1 * 4/2003 Kanzaki et al. ............... 382/298
6,581,164 B1 * 6/2003 Felts et al. .................... 713/400
6,867,781 B1 * 3/2005 Van Hook et al. ............ 345/506
6,924,807 B2 * 8/2005 Ebihara et al. ................ 345/503
6,940,516 B1 * 9/2005 Dotson ......................... 345/537
7,091,944 B2 * 8/2006 Wang ........................... 345/100
7,176,947 B2 * 2/2007 Kudo et al. ................... 345/690
7,215,339 B1 * 5/2007 Dotson ......................... 345/558
8,350,791 B2 * 1/2013 Takahashi et al. .............. 345/87
2001/0015769 A1 * 8/2001 Yamazaki ..................... 348/554

(Continued)

OTHER PUBLICATIONS

Fractional/Integer-N PLL Basics, Barrett, 1999.*

(Continued)

*Primary Examiner* — Stephen R Koziol
*Assistant Examiner* — Phong Nguyen
(74) *Attorney, Agent, or Firm* — Volpe and Koenig, P.C.

(57) ABSTRACT

Methods and apparatus for improving the effects of display underflow using a variable horizontal blanking interval are disclosed. One embodiment of the present invention is a method of display that includes detecting a data ready signal that indicates availability of display data for transmission from a display pipeline, and generating a line-transmit signal based upon a clock signal and the data ready signal. The line-transmit signal is provided to the display pipeline. The line-transmit signal is substantially coincident with the clock signal if the data ready signal is set, and may be delayed if the data ready signal is not asserted. The display pipeline transmits the display data upon receiving the line-transmit signal. Another embodiment is an apparatus including a display pipeline configured to set a data ready signal when the display data is available for transmission, and a timing generator coupled to the display pipeline and configured to generate a line-transmit signal based on the status of the data ready signal.

22 Claims, 5 Drawing Sheets

(56) References Cited

U.S. PATENT DOCUMENTS

| | | | | |
|---|---|---|---|---|
| 2002/0013872 | A1 * | 1/2002 | Yamada | 710/240 |
| 2004/0054843 | A1 * | 3/2004 | Abhay et al. | 710/317 |
| 2004/0085283 | A1 * | 5/2004 | Wang | 345/100 |
| 2006/0022985 | A1 * | 2/2006 | Shepherd et al. | 345/535 |
| 2006/0125835 | A1 * | 6/2006 | Sha et al. | 345/560 |
| 2007/0231710 | A1 * | 10/2007 | Aton et al. | 430/5 |
| 2009/0102849 | A1 * | 4/2009 | Khodorkovsky et al. | 345/538 |
| 2010/0149413 | A1 * | 6/2010 | Kumakawa | 348/447 |
| 2011/0032364 | A1 * | 2/2011 | Sheng | 348/184 |

OTHER PUBLICATIONS

Phase-Locked Loop Basics, PLL, Altera, 2005.*

* cited by examiner

101

300

METHOD AND SYSTEM FOR IMPROVING DISPLAY UNDERFLOW USING VARIABLE HBLANK

BACKGROUND

1. Field of the Invention

The present invention relates to improving the quality of display systems.

2. Background Art

Present day computers have vastly improved graphics processing capabilities compared to computers of just a few years ago. Nevertheless, increasingly stringent requirements are imposed upon modern graphics processors partly due to the complexity of the graphics being rendered and the demands of high quality displays. Increases in the speed and complexity of operations, and the desire to reduce costs can expose various issues with graphics processing platforms.

The graphics processing system in a computer system may exist either as an integrated system of the computer system, or as a separate graphics controller card that is plugged into the computer system. In the former case, graphics processing modules generally compete for system resources, such as memory, with other system components. In the latter case, the separate graphics controller card may include some of its own resources, such as a memory, a processor, graphics processing modules, and display generation modules.

In either case, it often happens during program execution that contention for resources has a negative impact on the generated output. In graphics processing, for example, the graphics processing pipeline trying to access video data in a shared memory may be delayed due to multiple devices in the computer system attempting to access the same shared memory. Such contention delays occur at least in part because the independent interfaces available to access a memory are few, and the number of modules that can concurrently attempt accessing the memory can overwhelm the available independent interfaces. Contention delays can have a substantial negative impact on the performance of a computer system. Various techniques exist to reduce contention while maintaining a satisfactory speed of system operation.

In addition to decreasing the performance efficiency of the computer system, contention delays in the graphics processing system can cause visual defects in displayed data. Defects in displayed data may affect the quality of the display presented to the user, and/or inject erroneous information to display data that is further processed before display to a user. For example, contention induced delays in accessing shared memory may cause the display of old data in some situations. For example, one or more pixels in a screen may be displayed based on old data already in display memory from a previous display frame, while the rest of the data is based on a current video frame. For many applications, such defects may be highly undesirable.

What are needed therefore are systems and methods for reducing visual defects that result from contention for system resources in graphics processing systems.

SUMMARY OF EMBODIMENTS OF THE INVENTION

Methods and apparatus for improving a display by reducing the effects of display underflow using a variable horizontal blanking interval are disclosed. One exemplary embodiment of the present invention provides a method of display including detecting a data ready signal that indicates availability of display data for transmission from a display pipeline, and generating a line-transmit signal based upon a clock signal and the data ready signal. The line-transmit signal is provided to the display pipeline. In an embodiment, the line-transmit signal is substantially coincident with the clock signal when the data ready signal is asserted. In another embodiment, the line-transmit signal is delayed with respect to the clock signal when the data ready signal is not asserted. The display pipeline transmits the display data upon receiving the line-transmit signal.

Another embodiment provides an apparatus including a display pipeline configured to assert a data ready signal when display data is substantially available for transmission, and a timing generator coupled to the display pipeline and configured to generate a line-transmit signal based on the status of the data ready signal. In an embodiment, the first and second devices may be located in one graphics processing card.

Yet another embodiment provides a computer readable media storing instructions which, when executed, are adapted to transmit display data using a method. The method includes, detecting a data ready signal that indicates availability of display data for transmission from a display pipeline, and generating a line-transmit signal based upon a clock signal and the data ready signal. The line-transmit signal is provided to the display pipeline.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION OF EMBODIMENTS OF THE INVENTION

Figure 1:
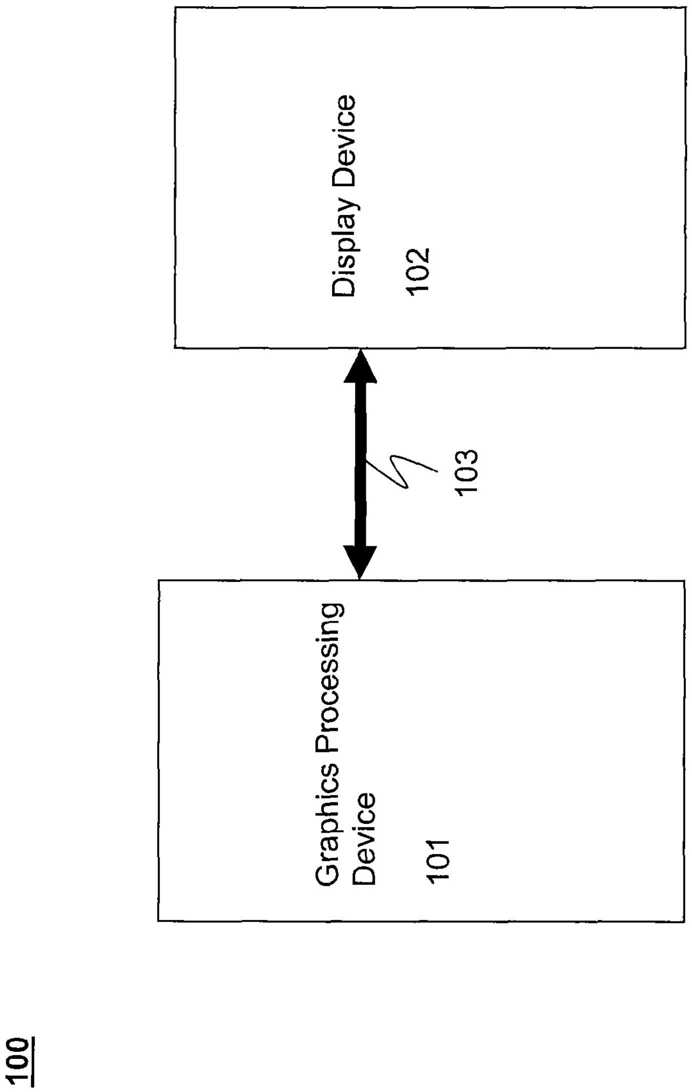
FIG. 1 is an illustration of a graphics processing device and a display device, according to an embodiment of the present invention.

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments of the present invention may be used in any computer system or computing device where display data is generated. For example, and without limitation, embodiments of the present invention may include computers, game platforms, entertainment platforms, personal digital assistants, televisions, and video platforms.

Most modern computer systems are capable of multi-processing, for example, having multiple processors such as, but not limited to, multiple central processor units (CPU), graphics processor units (GPU), and other controllers, such as memory controllers and/or direct memory access (DMA) controllers, that offload some of the processing from the processor. Also, in many graphics processing devices, a substantial amount of parallel processing is enabled by having, for example, multiple data streams that are concurrently processed.

Such multi-processing and parallel processing, while significantly increasing the efficiency and speed of the system, may give rise to many issues including issues due to synchronization of the various system components. One such issue is the problem caused by contention, i.e., multiple devices attempting to simultaneously access or use the same system resource. For example, many system components require access to shared memory to carry out their processing. But, because the number of interfaces to the shared memory components may not be adequate to support all concurrent requests for access, contention arises and one or more system components that require access to the shared memory in order to continue its processing may get delayed.

In a graphics processing device, the graphics pipeline requires frequent access to memory to retrieve, manipulate, and/or process graphics objects (i.e., pixel data) stored in the memory. However, numerous other system components may also require varied levels of access to the memory through the same interface. When the graphics pipeline encounters a delay in accessing data in the memory, it may not be able to generate the correct data for display in that display interval. For example, other display components trigger the graphics pipeline to output a line of display data at regular intervals. If the graphics pipeline does not have the data ready at the time it receives the trigger to transmit the line, it may transmit incorrect data, or data from a previous display buffer may be substituted for the new data. In any case, such delays frequently result in undesirable visual defects in the displayed data.

As described in the Background section above, contention delays may result in defective visual displays and/or the generation of defective data. A specific example in conventional graphics processing systems may be the effect that is caused due to a synchronization issue between the display pipeline and the corresponding timing generator. The timing generator issues a signal at regular intervals upon receipt of which the display pipeline transmits the data to be next displayed. In order to transmit the data to be next displayed upon receiving the regular signal from the timing generator, the display pipeline should already have had retrieved that data from a memory and readied it for transmission. When the memory from which the data is to be retrieved is a shared memory, contention delays may occur, leaving the display pipeline without the data to be next displayed when it receives the signal to transmit from the timing generator. Often, in such situations where the display pipeline does not have the data to be next displayed, the display pipeline will transmit other data, possibly inaccurate data or no data at all, leading to the occurrence of visually defective displays.

Embodiments of the present invention establish a communication between components of a graphics processing device, such as, for example, the display pipeline and the corresponding timing generator, to reduce the negative effects of synchronization problems such as that described above with respect to conventional graphics processing systems. In one embodiment, a method of communication between the display pipeline and the corresponding timing generator is established to reduce synchronization problems when transmitting lines of display data. Display data, may be transmitted out of a display pipeline one line at a time. For example, in transmitting a video frame in a raster scan, lines are transmitted in sequence of the top line of a raster scan to the bottom line of the raster scan. Each line is generally transmitted in a left-to-right sequence. The interval between the transmissions of two such lines is known as the line interval or horizontal blank interval (HBLANK). The timing generator may be triggered at regular intervals corresponding to HBLANK, to generate a signal, referred to in the description below as a line-transmit signal. In embodiments of the present invention, before generating the line-transmit signal, the timing generator checks whether the display pipeline has in fact indicated that it has the next line of display data ready. If the display pipeline has not indicated that the next line of display data is ready, i.e., a display underflow, the timing generator delays the generation of the line-transmit signal. In this manner, an embodiment of the present invention reduces visual defects that occur in conventional systems due to the display pipeline transmitting lines of display data before it has the data ready. More specifically, an embodiment of the present invention enables a variable HBLANK interval to reduce the display defects caused by display underflow situations.

FIG. 1 illustrates a computer system 100 according to an embodiment of the present invention. Computer system 100 includes a graphics processing device 101 and a display device 102. Graphics processing device 101 and display device 102 are interconnected by an interface 103. Computer system 100 may be any computer device that includes graphics processing capabilities, such as, including, but not limited to personal computers, computing servers, game consoles, media servers, personal digital assistants, television, and other video display devices.

Graphics processing device 101 can include a separate graphics controller card coupled to computer system 100 or a graphics processing system integrated into computer system 100. Graphics processing device 101 includes the functionality to process graphics data and transmit the processed graphics data to an external display or to an internal display. The data transmitted out of graphics processing device includes pixel data as well as control data that controls the display of the data on a screen. Pixel data and the corresponding control data are herein collectively referred to as display data. Further details of graphics processing device 101 are described with respect to FIG. 2.

Display device 102 includes the functionality and the processing components to display pixel data received from graphics processing device 101 over interface 103. In one embodiment, display device 102 includes a timing controller, a display driver, and a display. The timing controller receives pixel data and/or control information from graphics processing device 101 and generates the signals that cause the pixel data to be displayed on a display. The display driver drives the display of data on the display by appropriately driving, for example, the rows and columns of the display according to the data. The display can include liquid crystal display (LCD), a cathode ray tube (CRT) display, or any other type of display device. In some embodiments of the present invention, the display and some of the components required for the display, such as, for example, the display driver may be external to the computer system 100 in which the graphics processing device is located.

Interface 103 connects graphics processing device 101 to display device 102. In one embodiment, interface 103 includes a ribbon-cable over which a display data transmission standard such as DisplayPort is implemented. In other embodiments, interface 103 may implement one or more data transmission standards such as, but not limited to, embedded DisplayPort (eDP), low voltage display standard (LVDS), Digital Video Interface (DVI), or High Definition Multimedia Interface (HDMI).

Figure 2:
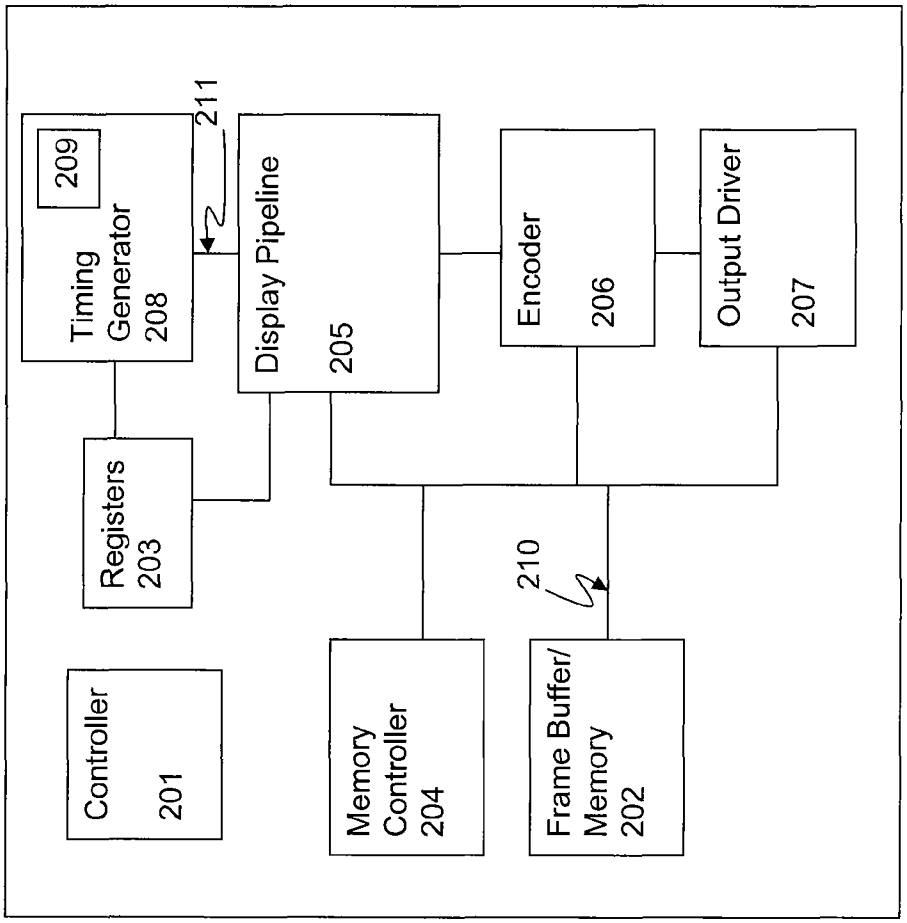
FIG. 2 is an illustration of a graphics processing device, according to an embodiment of the present invention.

FIG. 2 shows graphics processing device 101, according to an embodiment of the present invention. Graphics processing device 101 may include a processor 201, a memory 202, a bank of registers 203, a memory controller 204, a display pipeline 205, an encoder 206, an output driver 207, and timing generator 208. Processor 201 may comprise a generic or specialized processor that controls the operations of graphics processing device 101 and the execution of any modules included in graphics processing device 101, such as, for example, modules 204-208. The processing logic specifying modules 204-208 may be implemented using a programming language such as C, C++, or Assembly. In another embodiment, logic instructions of one or more devices 204-208 can be specified in a hardware description language such as Verilog, RTL, and netlists, to enable ultimately configuring a manufacturing process through the generation of maskworks/photomasks to generate a hardware device embodying aspects of the invention described herein. This processing logic and/or logic instructions can be disposed in any known computer readable medium including magnetic disk, optical disk (such as CD-ROM, DVD-ROM), flash disk, and the like.

Memory 202 may include a dynamic random access memory (DRAM) in which display data, particularly pixel data but sometimes including control data, is stored. Memory 202, in the context of a graphics processing device such as here, may also be referred to as frame buffer. Display data, either generated within computer system 100 or input to computer system 100 using an external device such as a video playback device, can be stored in memory 202. Display data stored in memory 202 is accessed by components of graphics processing device 101 that manipulates and/or processes that data before transmitting the manipulated and/or processed display data to another device, such as, for example, display device 102.

Registers 203 may be integrated with memory 202, or may exist separately from memory 202. In some embodiments registers 203 are implemented using static random access memory (SRAM). Registers 203 are used by processing components within graphics processing device 101 to communicate between them. For example, display pipeline 205 and timing generator 208 may use one or more registers in register bank 203 to exchange signals that are necessary to synchronize the processing activities of those components.

Memory controller 204 includes functionality to coordinate access to memory 202. Memory 202 is accessed by display pipeline 205 while manipulating and/or processing display data, and also to hold intermediate processing output. For example, memory controller 204 would arbitrate requests to access memory 202 by various components such as display pipeline 205.

Display pipeline 205 includes one or more logic blocks and/or devices having the functionality to manipulate and/or process display data. The display data may have been generated locally by computer system 100 and may also include externally generated display data, such as, video data input to computer system 100 from a video recording or playback device. For example, video frame data from an external video playback device may be stored in memory 202 after being decoded by a decoder component (not shown) of graphics processing device 101. The video frame data stored in memory 202 may then be further processed and/or enhanced by display pipeline 205.

Encoder 206 may encode video frames processed by display pipeline 205 according to a predetermined compression and/or encoding standard. In one embodiment, encoder 206 takes as input the display data output by display pipeline 205 and formats and/or encodes that display data to be transmitted to display device 102 over interface 103. Example encoding standards that can be implemented in encoder 206 include uncompressed display and transport formats, such as, but not limited to, DisplayPort, embedded DisplayPort, DVI, HDMI, LVDS, or an encoding standard that includes compression such as the Motion Picture Experts Group version 2 (MPEG2). In some embodiments, encoder 206 may be integrated in display pipeline 205, in which case, the output from display pipeline 205 may be a stream of encoded frames suitable for transmission over interface 103. The speed of operation of display pipeline 205 may be a primary factor in the quality of the displayed images. For example, complex graphics such as that generated in fast-paced games or certain video scenes may require that the display pipeline processes frames at fast rates where each frame also requires complex graphics computations. The speed of operation of display pipeline 205 may be controlled by control processor 201 using one or more clocks that regulate the pixel processing speed and the speed of operation of the interface between display pipeline 205 and memory 202, for example, interface 210.

Timing generator 208 triggers the output of display data and other control information from display pipeline 205 and/or encoder 206. Control information may include framing information, such as, frame interval, frame length, etc. Timing generator 208 generates timing, including, either a preconfigured or dynamically configurable interframe interval, or a line interval (HBLANK), i.e. the interval between two successive lines. Timing generator 208 can generate timing using methods including the use of an internal or external clock 209. For example, timing generator 208 may ensure that the interframe interval between any two video frames in the stream of frames transmitted out of device 205 is substantially constant. Timing generator 208 may also generate control signals including horizontal synchronization and vertical synchronization signals for each frame. In some embodiments, timing generator 208 and display pipeline 205 exchange signals and/or messages over one or more interfaces 211 between them.

Data and control information from timing generator 208, display pipeline 205, and/or encoder 206, are transmitted using output driver 207. Output driver 207 includes functionality to transmit frames over interface 103. Output driver 207 also includes functionality to transmit any required control signals over interface 103. For example, in one embodiment, output driver 207 includes functions necessary to transmit video frames and control information over interface 103 using the DisplayPort interface standard. In an embodiment, output driver 207 can include a differential transmitter. For example, in one embodiment, output driver 207 includes functions necessary to transmit video frames and control information over interface 103 using LVDS. Differential transmitters can, in general, consume less power because data transmission relying on differentiation of corresponding positive and negative signals can be achieved with a lower voltage compared with data transmission using voltage variation.

Figure 3:
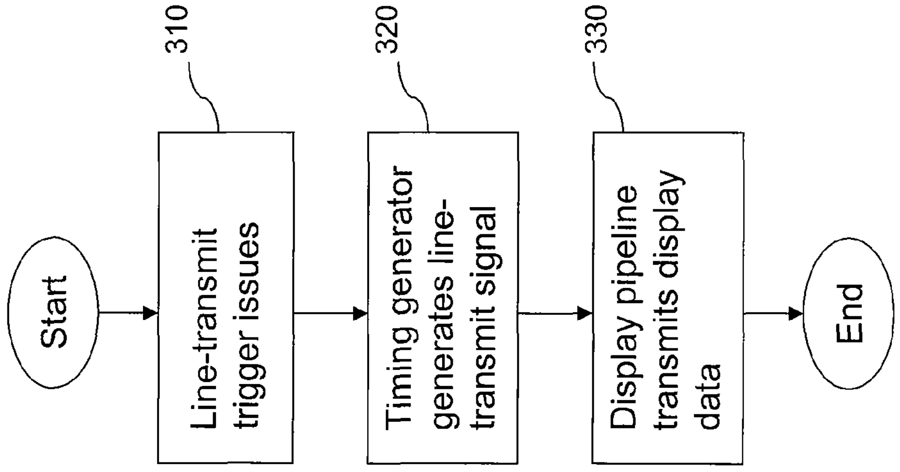
FIG. 3 is an illustration of an exemplary method of transmitting display data from a graphics processing device according to an embodiment of the present invention.

FIG. 3 is a flowchart illustrating the processing in the transmission of a line of display data according to an embodiment of the present invention. In processing block 310, a component, for example, timing generator 208 receives a trigger to generate a line-transmit signal that would cause the transmission of a line of display data. In one embodiment, the trigger may be generated by a separate clock or oscillator that is coupled to timing generator 208. In another embodiment, the trigger may be generated based on an internal timing mechanism of timing generator 208. For example, the timing device issuing the trigger may be configured to issue the trigger at preconfigured fixed intervals.

In processing block 320 a line-transmit signal is generated, for example, by timing generator 208. In one embodiment, timing generator 208 may generate the line-transmit signal in response to triggers received at substantially constant time intervals. The timing interval may be preconfigured or may be dynamically configured based on display device characteristics and application characteristics. For example, particular display devices, user preferences, and/or characteristics of the displayed application such as games and display of movies, may require specific screen resolution and refresh rate settings based upon which the duration of the timing interval at which the timing generator issues the line-transmit signals is configured. Further details of processing in timing generator 208 to produce the line-transmit signal are described below with respect to FIG. 5.

In processing block 330, a display pipeline, for example, display pipeline 205, responds to the line-transmit signal issued from a timing generator by transmitting a line of display data out of the display pipeline. For display pipeline 205 to be able to transmit the line of display data upon receiving the line-transmit signal, several processing blocks should have already been completed. For example, display pipeline 205 should have had to access memory 202 to retrieve the line of display data, and to have completed any required processing on the retrieved data. As described above, access to a shared memory, such as memory 202, may delay operations due to contention. In embodiments of the present invention, the timing generator is configured to issue the line-transmit signal only when the display pipeline has indicated that it has successfully completed the necessary accesses to memory with respect to the current line of display data. Further details of processing in display pipeline 205 to transmit the line of display data is described with respect to FIG. 4 below.

Figure 4:
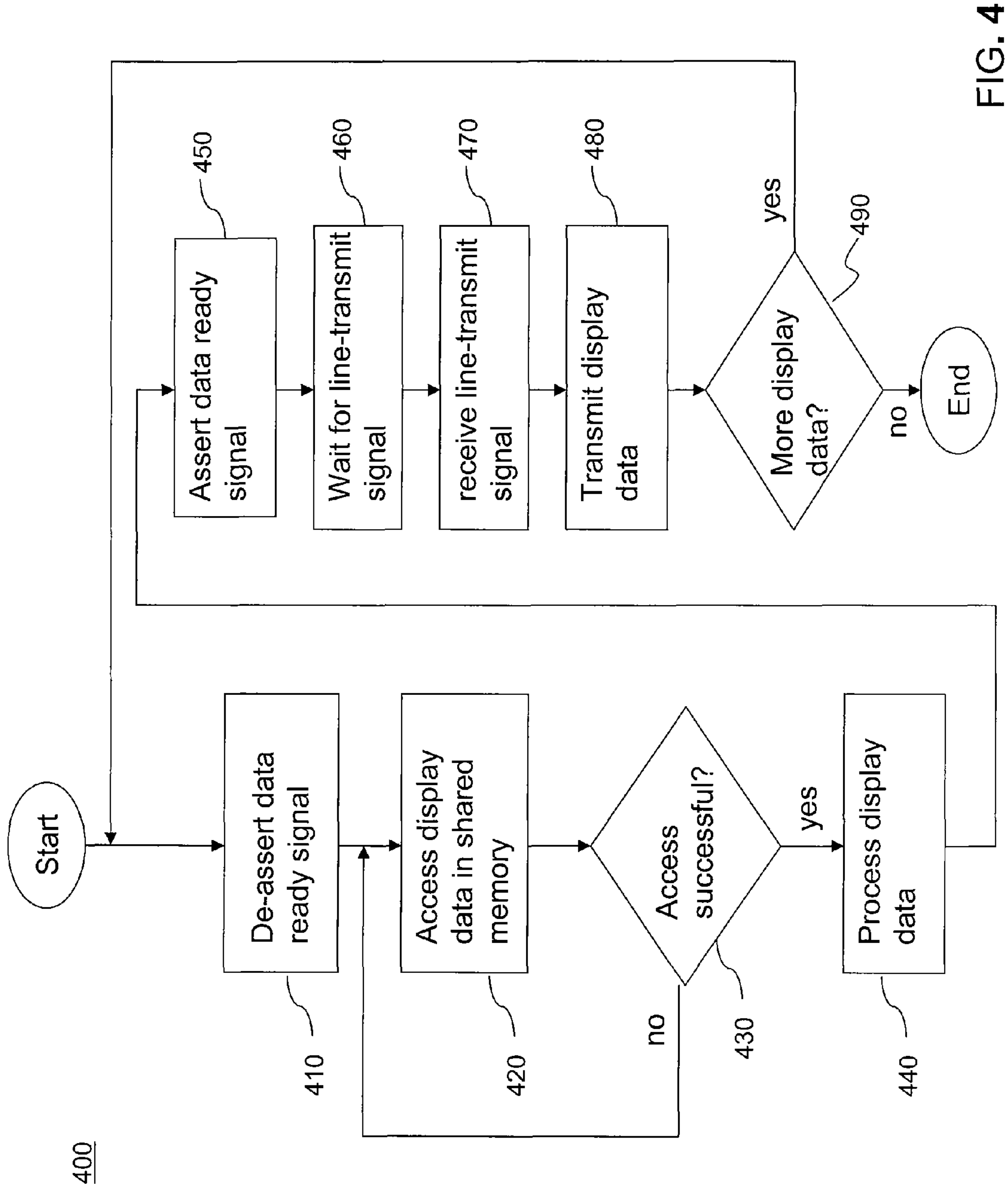
FIG. 4 is an illustration of an exemplary method of processing in a display pipeline of a graphics processing device to retrieve, process, and output display data from the display pipeline, according to an embodiment of the present invention.

FIG. 4 is an illustration of an exemplary method 400 of processing in a display pipeline according to an embodiment of the present invention. By way of example, the method 400 can be implemented within the system 101, shown in FIG. 2.

In the method 400, processing blocks 410-490 illustrate a method for a display pipeline to communicate with other components of a graphics processing device, such as a timing generator, when it is determined that a line of display data is substantially ready for transmission from the display pipeline. In other embodiments, display data is substantially ready for transmission out of the display pipeline when the accesses to a shared memory (e.g. required for processing the display data in the display pipeline) have been completed.

In processing block 410, the display pipeline de-asserts the data ready signal. The data ready signal can be implemented using one of many methods of communicating between the timing controller and the display pipeline. For example, the data ready signal can be indicated using a dedicated wire from display pipeline 205 to timing controller 208, a message over an interface 211 between display pipeline 205 and timing controller 208, or a register in register bank 203. In de-asserting the data ready signal, the display pipeline attempts to ensure that the timing generator would not incorrectly detect an asserted data ready signal.

In some embodiments, de-assertion of the data ready signal may be performed by another component. For example, timing generator 208 may de-assert the data ready signal immediately after it generates a line-transmit signal. The de-assertion of the data ready signal should be performed such that an asserted data ready signal can definitively indicate an explicit acknowledgement by the display pipeline that it has succeeded in accessing memory to retrieve the next line of display data to be transmitted.

In processing block 420, after the data ready signal is de-asserted in processing block 410, the display pipeline accesses the next line of display data in shared memory. Access to memory is coordinated by a component, such as, for example, a memory controller. The display pipeline may issue the request to access memory for the next line of display data either synchronously or asynchronously. If the request is synchronous, the relevant display pipeline processing thread may generate the memory access request and wait for its return. If the request is asynchronous, the display pipeline may generate the memory access request and continue its processing, with the status of the request to access memory being determined after a preconfigured interval from the time the request was generated. For example, an interrupt may be generated after the lapse of a preconfigured interval from the generation of the memory access request, which in turn causes the display pipeline to check the status of its memory access request.

In processing block 430, it is determined whether the memory access request was successful. For example, the memory access request may be successful if the sought line of display data was returned to the display pipeline within a predetermined time interval, and unsuccessful otherwise. If the memory access attempt was unsuccessful, processing may return to processing block 420 and issue another memory access request. If the memory access attempt is successful, then processing moves on to processing block 440.

In processing block 440, the line of display data accessed in memory is processed. In some embodiments, processing of the line of display data may take place while that data is located in memory in its original location, and/or one or more other locations in memory to which the display data is copied. In other embodiments, the line of display data may be copied onto a local memory of the display pipeline separate from memory 202 such that processing can take place using the local memory. Without loss of generality, processing block 440, or processing blocks 420-440, are repeated such that the accesses to memory to access, process, and retrieve the next line of display data are completed.

In processing block 450, having completed the accesses to shared memory required for the next line of display data in processing block 440, the display pipeline asserts the data ready signal. In some embodiments, the display pipeline may retrieve the next line of display data from shared memory and store the display data in a non-shared memory local to display pipeline. In other embodiments the next line of display data may be maintained in shared memory and the display pipeline may communicate with other components by passing a reference to the next line of display data in shared memory. As described previously, for example, with respect to processing block 410, the data ready signal may be indicated by a dedicated wire between display pipeline 205 and timing generator 208 over which an electrical signal indicating data readiness is transmitted. In another embodiment, the data ready signal may be indicated with a message sent from the display pipeline to the timing generator over a control data interface, such as, for example, interface 211. In other embodiments the display pipeline may assert the data ready signal by writing into a register, such as, for example, in register bank 203.

In processing block 460, the display pipeline waits to receive a line-transmit signal, for example, from timing generator 208. The display pipeline may, in this processing block, may wait for the line-transmit signal by, for example, stalling one or more processing threads that process and/or transmit the next line of display data. If the display pipeline or one or more threads of the display pipeline waits to receive a line-transmit signal, a protection mechanism such as a periodic check can be implemented to ensure that, after a predetermined interval of waiting, a default action is taken if no line-transmit signal is received. The default action taken may include the generation of an error message and/or the transmission of a line of display data—either the next line of display data that has been readied for transmission, or some other line of display data. The display pipeline may also proceed with any processing and be interrupted when a line-transmit message is received, upon which the next line of display data can be transmitted.

In processing block 470, display pipeline 205 receives a line-transmit signal from the timing generator. Line-transmit signals may be received by the display pipeline using several methods based on how the line-transmit signal is asserted by the timing generator. For example, a line-transmit signal may be received by monitoring a signal on a dedicated wire between the timing generator and the display pipeline, by receiving a message from the timing generator over interface 211, or by reading a designated register in register bank 203.

In processing block 480, the next line of display data is transmitted out of the display pipeline. The display data transmitted out of the display pipeline may be directed to an encoder, for example, encoder 206 that formats the display data for transmission and/or display. As described previously, the transmission of the next line of display data by the display pipeline may be accomplished by transmitting the data itself, or in some embodiments, transmitting a pointer to the memory where the next line of display data is stored.

Having transmitted the next line of display data in processing block 480, in processing block 490, the display pipeline determines if more data is to be transmitted. If more data is to be transmitted, then the display pipeline repeats processing blocks 410-490 to transmit each line of display data. When no more lines of display data is to be transmitted, process 400 may terminate.

Figure 5:
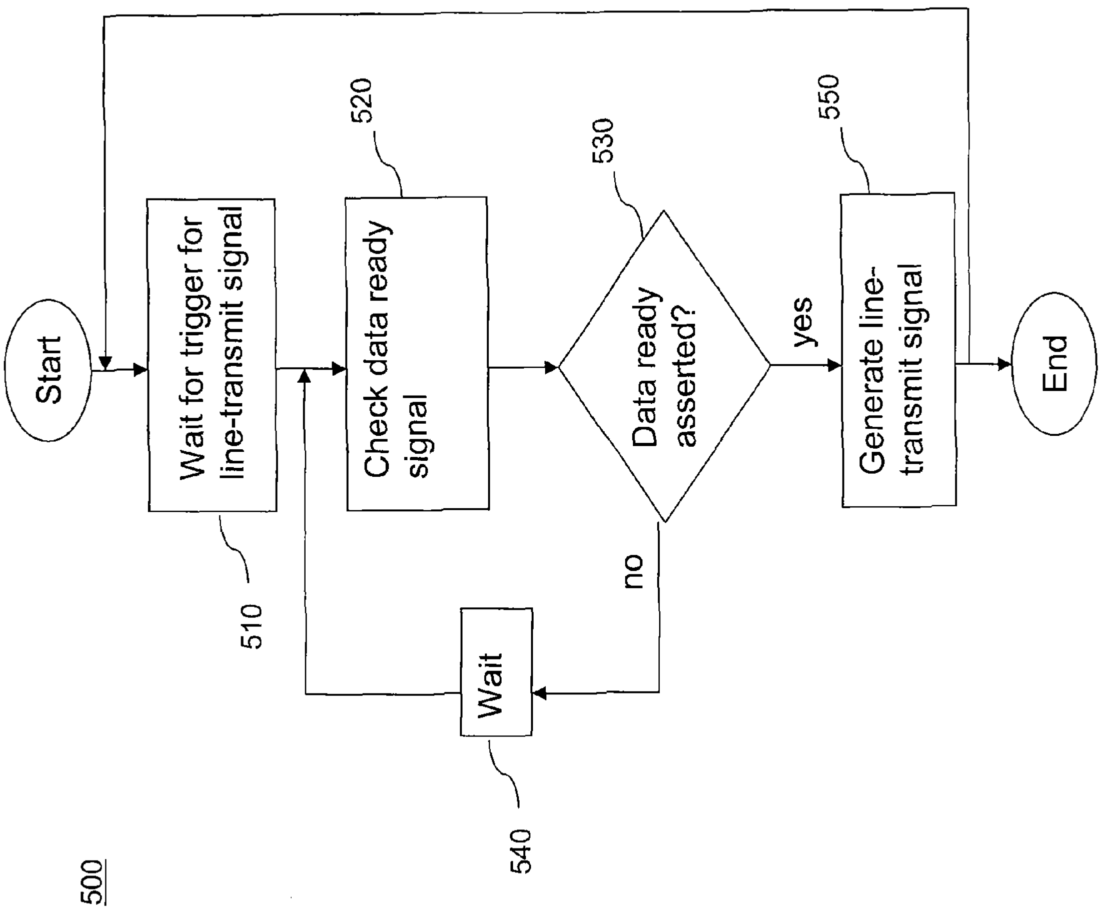
FIG. 5 illustrates processing in a timing generator of a graphics processing device to generate line-transmit signals, according to an embodiment of the present invention.

FIG. 5 shows a process 500 (processing blocks 510-550) by which a timing generator generates a line-transmit signal, according to an embodiment of the present invention. Process 500 may be implemented, for example, in timing generator 208. In processing block 510, the timing generator, or one or more threads of operation in the timing generator that generates the line-transmit signal, waits for a trigger to generate a line-transmit signal. A trigger to generate a line-transmit signal may be generated based on, for example, a clock that is local or external, a separate clocking device, or a clock recovered from a data stream.

The trigger to generate a line-transmit signal may be generated periodically at a configured interval. In some embodiments, the trigger may be generated at regular intervals based on an interval configured and/or determined based on criteria such as display device characteristics including screen resolution and refresh rate, and type of display data. In some embodiments the trigger may be generated at different regular intervals depending on the state of communication between the timing generator and the display pipeline. For example, while the trigger issues at regular intervals at which the system is configured to transmit a line of display data out of the display pipeline, within the duration of one of these intervals additional triggers may be generated.

When a trigger to generate a line-transmit signal is received, timing generator 208 may be configured to check whether a data ready signal is asserted by the display pipeline indicating that the next line of display data is substantially ready to be transmitted. For example, in processing block 520, the timing generator checks a data ready signal asserted by the display pipeline. As described above with respect to FIG. 4, the display pipeline can assert the data ready signal to a timing generator in one of many ways. For example, through signaling on a dedicated wire from the display pipeline to the timing generator, through a message sent on a multi-use interface between the display pipeline to the timing generator, or through writing to a register. Accordingly, based on how the display pipeline is configured to assert the data ready signal, the timing generator may check whether the that signal is asserted by detecting a signal on a dedicated wire from the display pipeline, receiving a message on an interface, such as, interface 211, or by reading a predetermined register, for example, in register bank 203.

If it is determined in processing block 530 that the display pipeline has not asserted the data ready signal indicating the substantial readiness of the next line of display data, then the timing generator transitions to a waiting mode in processing block 540. In the waiting mode, the timing generator may periodically check for the assertion of the data ready signal. The waiting mode may also include a protection mechanism, where, for example, after a predetermined interval has elapsed since the wait period started, the timing generator will transition out of the wait state and generate a line-transmit signal regardless of whether the display pipeline has asserted the data ready signal. Such a protection mechanism may be useful to ensure the continued operation of the system, although when a line-transmit signal due to the activation of the protection mechanism occurs, then incorrect data may be transmitted out of the display pipeline in response to that signal.

If, in processing block 530, it is determined that a data ready signal has been asserted indicating the substantial readiness of the next line of display data, then the timing generator moves to processing block 550. In processing block 550, the timing generator generates a line-transmit signal indicating that the display pipeline should transmit the next line of display data. As described earlier with respect to FIG. 4, the line-transmit signal may be asserted in one of many ways, including, for example, signaling over a dedicated wire from the timing generator to the display pipeline, sending a message over a multi-use interface between the timing generator and the display pipeline, or writing to a predetermined register from which the display pipeline can read. After the line-transmit signal is issued in processing block 550, the timing generator may repeat processing blocks 510-550 to cause the transmission of more display data.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of displaying data, comprising:

detecting, at a timing generator, an assertion of a data ready signal in a display pipeline, the display pipeline having access to a shared system resource that is accessed by a plurality of devices, wherein the data ready signal indicates the availability of the shared system resource and the readiness of a line of display data for transmission from the display pipeline; and generating, by the timing generator, a line-transmit signal based upon a clock signal and the asserted data ready signal, wherein the line-transmit signal is provided to the display pipeline and indicates that the display pipeline should transmit the line of display data.

2. The method of claim 1, wherein the line-transmit signal is substantially coincident with the clock signal when the data ready signal is asserted.

3. The method of claim 1, wherein the line-transmit signal is delayed with respect to the clock signal when the data ready signal is not asserted.

4. The method of claim 1, further comprising:

determining the availability of the line of display data for transmission; and asserting the data ready signal when the line of display data is available for transmission.

5. The method of claim 4, wherein the determining the availability of the line of display data for transmission comprises:

retrieving the line of display data from a memory.

6. The method of claim 5, wherein determining the availability of the line of display data for transmission further comprises:

processing the line of display data before said asserting the data ready signal.

7. The method of claim 4, wherein the asserting the data ready signal includes:

signaling on a dedicated wire from the display pipeline.

8. The method of claim 4, wherein the asserting the data ready signal includes:

transmitting a message from the display pipeline.

9. The method of claim 4, wherein the asserting the data ready signal includes:

modifying a predetermined register, wherein the predetermined register represents the data ready signal.

10. The method of claim 1, wherein the display pipeline is configured to de-assert the data ready signal.

11. The method of claim 1, wherein a timing generator is configured to de-assert the data ready signal after generating the line-transmit signal.

12. The method of claim 1, wherein the detecting the assertion of the data ready signal further comprises:

transitioning to a waiting mode when the assertion of the data ready signal is not detected.

13. The method of claim 12, wherein the waiting mode further comprises:

checking periodically for the assertion of the data ready signal during the waiting mode.

14. The method of claim 13, further comprising: transitioning out of the waiting mode after a predetermined time interval elapses.

15. An apparatus, comprising:

a display pipeline configured to assert a data ready signal, the display pipeline having access to a shared system resource that is accessed by a plurality of devices, wherein the data ready signal indicates the availability of the shared system resource and the readiness of a line of display data for transmission from the display pipeline; and a timing generator coupled to the display pipeline, and configured to generate a line-transmit signal based upon a clock signal and the data ready signal asserted by the display pipeline and indicates that the display pipeline should transmit the line of display data.

16. The apparatus of claim 15, wherein the timing generator is further configured to delay the generation of the line-transmit signal if the data ready signal is not asserted.

17. The apparatus of claim 15, wherein the display pipeline is further configured to transmit the line of display data out of the display pipeline upon receiving the line-transmit signal.

18. The apparatus of claim 15, wherein the display pipeline is further configured to retrieve the line of display data from a memory, and to assert the data ready signal after the line of display data is retrieved from the memory.

19. The apparatus of claim 15, wherein the display pipeline and the timing generator are located in a graphics processor card.

20. The apparatus of claim 15, wherein the display pipeline is configured to de-assert the data ready signal.

21. The apparatus of claim 15, wherein the timing generator is configured to de-assert the data ready signal after generating the line-transmit signal.

22. A non-transitory computer readable storage medium storing computer-executable instructions which, when executed, cause the transmission of a line of display data using a method comprising:

detecting, at a timing generator, an assertion of a data ready signal in a display pipeline, the display pipeline having access to a shared system resource that is accessed by a plurality of devices, wherein the data ready signal indicates the availability of the shared system resource and the readiness of the line of display data for transmission from the display pipeline; and generating, by the timing generator, a line-transmit signal based upon a clock signal and the asserted data ready signal, wherein the line-transmit signal is provided to the display pipeline and indicates that the display pipeline should transmit the line of display data.

* * * * *